(12) United States Patent
Gansert et al.

(10) Patent No.: US 7,370,631 B2
(45) Date of Patent: May 13, 2008

(54) FUEL INJECTION SYSTEM

(75) Inventors: Klaus-Peter Gansert, Vaihingen/Enz (DE); Axel Storch, Moeglingen (DE); Robert Koehler, Bad Liebenzell/Monakam (DE); Jens Botte, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 10/564,603

(22) PCT Filed: Jul. 7, 2004

(86) PCT No.: PCT/DE2004/001453

§ 371 (c)(1),
(2), (4) Date: Jul. 12, 2006

(87) PCT Pub. No.: WO2005/008039

PCT Pub. Date: Jan. 27, 2005

(65) Prior Publication Data

US 2007/0006843 A1    Jan. 11, 2007

(30) Foreign Application Priority Data

Jul. 10, 2003    (DE) .............................. 103 31 267

(51) Int. Cl.
*F02B 23/10*    (2006.01)
*F02M 61/18*    (2006.01)

(52) U.S. Cl. ..................................... 123/299; 123/305
(58) Field of Classification Search .......... 123/169 EL, 123/276, 279, 298, 299, 305
See application file for complete search history.

(56) References Cited

U.S. PATENT DOCUMENTS

| 4,492,194 A | 1/1985 | Chmela et al. .............. 123/276 |
| 4,721,081 A | 1/1988 | Krauja et al. ............... 123/298 |
| 6,725,828 B1 * | 4/2004 | Han et al. ................... 123/305 |
| 6,742,493 B2 * | 6/2004 | Ziegler et al. .............. 123/305 |

FOREIGN PATENT DOCUMENTS

| CN | 1113294 | 12/1995 |
| DE | 41 40 962 | 1/1993 |

(Continued)

*Primary Examiner*—T. M Argenbright
(74) *Attorney, Agent, or Firm*—Kenyon & Kenyon LLP

(57) ABSTRACT

A fuel-injection system including a fuel injector, having a plurality of spray-discharge orifices, which meters fuel into a combustion chamber of an internal combustion engine, has an ignition device, which projects into the combustion chamber, this ignition device having at least one first pole and one second pole. The fuel jets emerging from the spray-discharge orifices spread an essentially cone-shaped fuel fan below the region of the ignition device. The end of the at least one first pole is arranged to the side adjacent to the end of the second pole projecting into the combustion chamber, and both ends are located on approximately the same level of the longitudinal axis of the ignition device.

12 Claims, 4 Drawing Sheets

FOREIGN PATENT DOCUMENTS

| | | |
|---|---|---|
| DE | 197 14 796 | 10/1998 |
| DE | 19827219 | 1/1999 |
| DE | 100 26 321 | 11/2001 |
| DE | 10032336 | 1/2002 |
| DE | 69706739 | 7/2002 |
| DE | 10118164 | 11/2002 |
| DE | 10122350 | 11/2002 |
| DE | 10231582 | 1/2004 |
| JP | 55 164723 | 3/1981 |
| JP | 10176632 | 6/1998 |
| JP | 2002 106353 | 8/2002 |
| WO | WO 00/55481 | 9/2000 |

* cited by examiner

FUEL INJECTION SYSTEM

BACKGROUND INFORMATION

From German Patent Application No. DE 100 26 321, for example, a fuel-injection system having a fuel injector and an ignition device projecting into a combustion chamber is known. The fuel jets emerging from the fuel injector define a fuel cone. In the region of the spark plug, which is arranged in relatively close proximity to the fuel injector, the fuel cone has an angular section. Because of the angular section, two fuel jets are able to pass through the ignition device at a precisely defined distance, which is to ensure reliable ignition of the fuel.

A particular disadvantage of the fuel-injection system known from the aforementioned publication is that the fuel injector must be installed very carefully in order to precisely align the angular section with respect to the spark plug. In addition, the ignition device or the arrangement of the poles or electrodes must be mounted in such a way that it assumes an exactly defined position with respect to the fuel injector. The position of the ignition spark of an ignition device and the position and geometry of the jet pattern of the fuel injector must change only negligibly over the entire service life of the fuel-injection system so as to avoid misfirings, for example.

SUMMARY OF THE INVENTION

The fuel injector according to the present invention has the advantage over the related art that, in particular, the installation of the fuel-injection system is simplified considerably.

In particular, the ignition device or the arrangement of the poles or electrodes need not be aligned in relation to the fuel injector in a complicated manner. Neither does the fuel injector require labor-intensive alignment by rotation about the longitudinal axis.

The penetration depth of the ignition device into the combustion chamber is reduced, so that, for instance, the thermal loading of the ignition device, especially the poles, is reduced. The size of the ignition device is scalable, and the jet cone is ignited at the outer envelope.

In an advantageous manner, the end of the first pole and the end of the second pole are at least partially made of a noble metal, especially a platinum alloy. In this way the ignition spark is generated in a reliable manner only between the two ends, without being carried out of the region of the poles or the electrodes. The fuel may thus be ignited in a more reliable manner since little energy is given off to the electrodes in the form of heat as happens in undesired so-called creepage sparks, for instance.

It is also advantageous if the diameter of the ends of the first pole and the second pole amounts to less than one millimeter and/or if the distance between the end of the first pole and the end of the second pole is less than one millimeter. This, too, ensures that the spark is always generated in the same spot between the poles and remains there during the ignition process.

In a further development of the fuel injector according to the present invention the distance between the second pole and the cone envelope is between 0.5 and 3 mm. This provides reliable ignition, and the thermal loading of the ignition device is considerably reduced by the arrangement of the ignition device resulting therefrom, which leads to longer service life and exchange intervals.

The spray-discharge orifices, which widen towards the combustion chamber in a stepped manner, reduce or prevent the formation of deposits that may affect the geometry of the spray-discharged fuel in an undesired manner.

When using a multi-hole disk in which the spray-discharge orifices are arranged, the fuel injector and thus the fuel-injection system may be configured in a much simpler manner.

DETAILED DESCRIPTION

Figure 1:
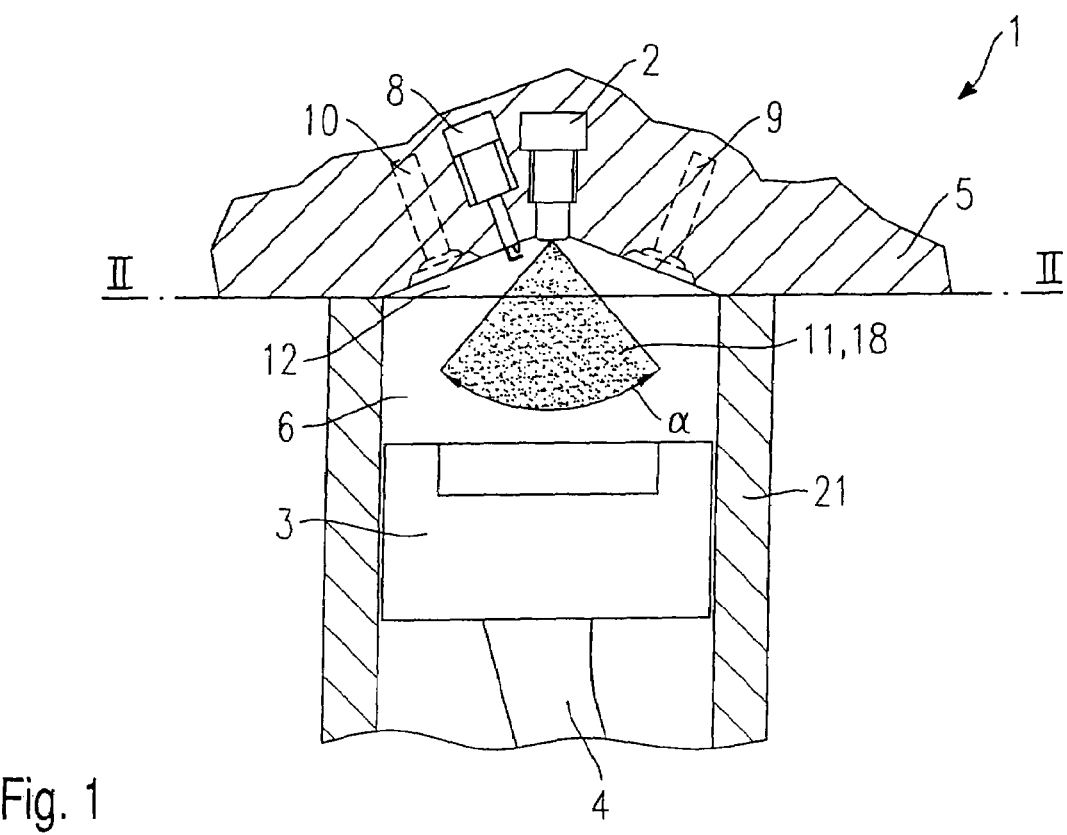
FIG. 1 shows a schematic section through an exemplary embodiment of a fuel injector configured according to the present invention.

An exemplary embodiment of the present invention is described below by way of example. Identical parts are provided with matching reference numerals in all of the figures.

An exemplary embodiment of a fuel-injection system 1 according to the present invention and illustrated in FIG. 1 is configured for mixture-compressing combustion engines having externally supplied ignition and internal mixture formation and combustion as well as jet-directed combustion method.

Figure 5:
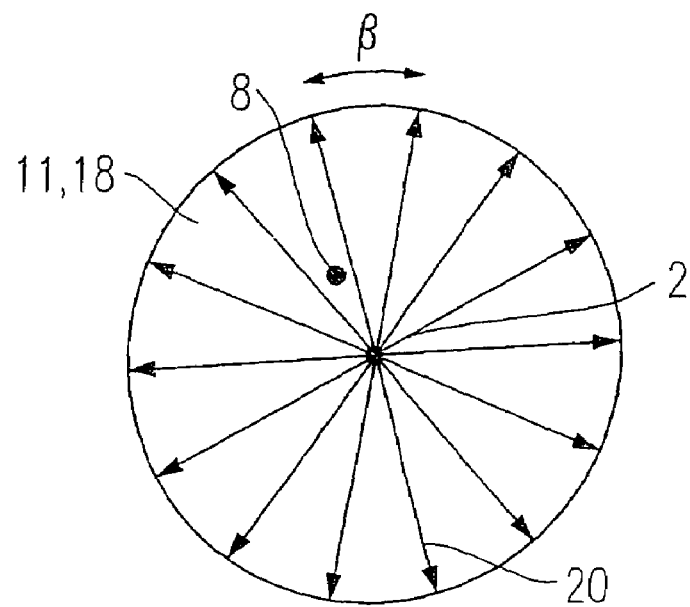
FIG. 5 shows a schematically illustrated jet pattern of a fuel injector of a fuel-injection system according to the present invention, the fuel injector producing a conical envelope.

In this exemplary embodiment, fuel-injection system 1 includes a cylinder 21 in which a piston 3 is guided. On one side, piston 3 is connected to a connecting rod 4 and, on the other side, it adjoins a combustion chamber 6. Combustion chamber 6 is also delimited by cylinder 21 and a cylinder head 5, which is disposed on the side of cylinder 21 facing away from connecting rod 4. Cylinder head 5 has a conical recess 12 that widens in the direction of cylinder 21 and forms a portion of combustion chamber 6. Coaxially arranged in recess 12 is a fuel injector 2 whose discharge-side end projects into combustion chamber 6. Fuel jets 20, which emerge from the discharge-side end of fuel injector 2 and are schematically illustrated in FIG. 5, spread a cone-shaped fuel fan 11 having an envelope-opening angle α, which preferably amounts to 70 to 110 degrees. Relatively close-by, at a slight lateral offset with respect to the discharge-side end of fuel injector 2, an ignition device 8 projects into combustion chamber 6 or into recess 12 to such a degree that a clearance of preferably 0.5 mm to 3 mm remains with respect to a fuel fan 11 forming a cone envelope 18. The fuel/air mixture produced in combustion chamber 6 is ignited by ignition device 8.

Furthermore, at least one discharge valve 10 and at least one intake valve 9 are likewise arranged in cylinder head 5.

Figure 2:
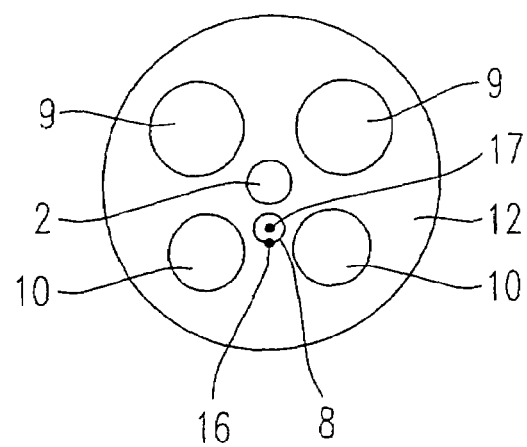
FIG. 2 shows a schematic section through the exemplary embodiment of the fuel-injection system according to the present invention, along line II-II in FIG. 1.

FIG. 2 shows a schematic section through the exemplary embodiment of fuel-injection system 1 according to the present invention, along line II-II in FIG. 1. Clearly visible is the centered position of fuel injector 2 in recess 12 as well as the position of ignition device 8 arranged a short distance therefrom at a lateral offset. In this representation, first pole 16 is located on the side of second pole 17 facing away from fuel injector 2. Due to the inventive measures, the position of first pole 16 is irrelevant, however, which simplifies the installation of ignition device 8. For instance, if ignition device 8 is screwed into cylinder head 5, the position of ignition device 8 or first pole 16 will not need to be controlled very carefully during installation and the threads on cylinder head 5 and ignition device 8 need not be produced with high manufacturing tolerances. Furthermore, no defined installation location of pole 16 on ignition device 8 will be required.

Figure 3:
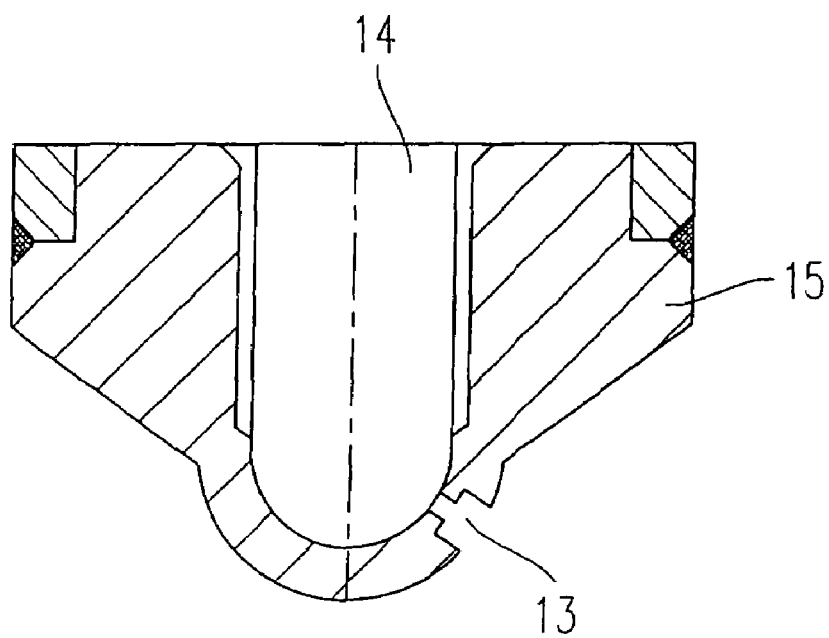
FIG. 3 shows a schematic section through the discharge-side end of a fuel injector of a fuel-injection system according to the present invention.

FIG. 3 shows a schematic section through the discharge-side end of a fuel injector 2 of a fuel-injection system 1 according to the present invention, which has a valve-seat body 15, a valve needle 14 and spray-discharge orifices 13 of which only one is shown. Spray-discharge orifices 13 widen in a stepped manner in the direction of combustion chamber 6. This prevents or lessens the formation of deposits in the region of spray-discharge orifice 13.

Figure 4:
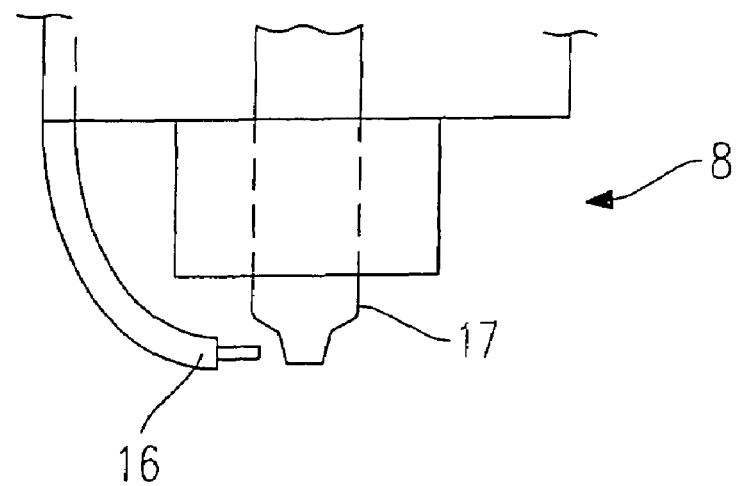
FIG. 4 shows a schematic representation of the end, projecting into the combustion chamber, of an ignition device of a fuel-injection system according to the present invention.

FIG. 4 shows a schematic illustration of the end of an ignition device 8 of a fuel-injection system 2 according to the present invention, this end projecting into combustion chamber 6. The end of the at least one first pole 16 is disposed to the side of the end, projecting into combustion chamber 6, of second pole 17, both ends being situated at approximately the same level of the longitudinal axis of ignition device 8. Both ends are preferably made of a platinum alloy so as to keep the ignition spark between the ends of poles 16, 17 during the entire ignition process. The diameters of the ends and their mutual clearance preferably amount to less than 1 mm.

FIG. 5 shows a schematically illustrated jet pattern formed by a fuel injector 2 of a fuel-injection system 1 according to the present invention, this fuel injector generating a cone envelope. Fuel jets 20, evenly spread to form a cone envelope 18, have an opening angle β of approximately 25 degrees relative to the respective adjacent fuel jet 20. In other exemplary embodiments, opening angle β may amount to between 25 and 45 degrees, and it is possible that the individual opening angles β of the preferably 4 to 12 fuel jets 20 produced by one spray-discharge orifice 13 in each case deviate from each other.

In the exemplary embodiment shown, the position of ignition device 8 relative to the discharge-side end of fuel injector 2 is approximately between two fuel jets 20, the position of fuel jets 20 relative to ignition device 8 being freely selectable as a result of the measures according to the present invention. Fuel jet 20 may, for instance, extend also exactly above ignition device 8. Analogously to the installation of ignition device 8, the installation of fuel injector 2 is considerably simplified thereby as well. If fuel injector 2 is screwed into cylinder head 5, for instance, the position of fuel injector 2 will not require precise control during installation and the threads on cylinder head 5 and fuel injector 2 need not be produced with high manufacturing tolerances.

The number of fuel jets 20 generated by one spray-discharge orifice 13 is preferable between 4 and 12 in each case.

Figure 6:
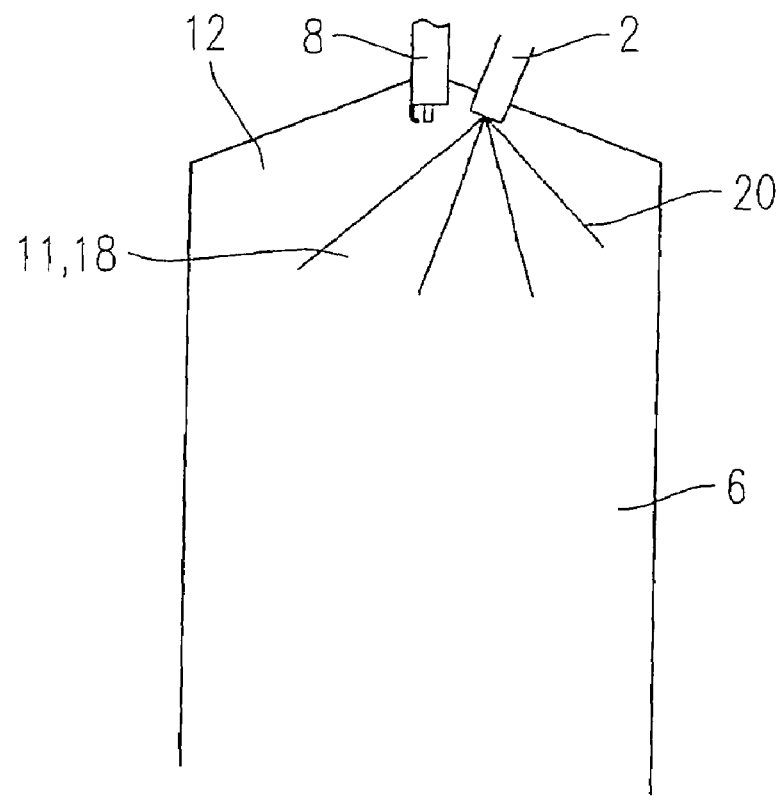
FIG. 6 shows a schematic section through another exemplary embodiment of a fuel-injection system designed according to the present invention.

FIG. 6 shows a schematic section through another exemplary embodiment of a fuel-injection system 1 configured according to the present invention, which is similar to the exemplary embodiment of FIG. 1. However, ignition device 8 is arranged coaxially or at the highest point of recess 12. In this exemplary embodiment, ignition device 8 is thus arranged coaxially with respect to combustion chamber 6 as well. Relatively close by, at a slight lateral offset with respect to ignition device 8, the discharge-side end of fuel injector 2 projects into recess 12 to such an extent that a clearance of preferably 0.5 to 3 mm remains relative to cone envelope 18.

Figure 7:
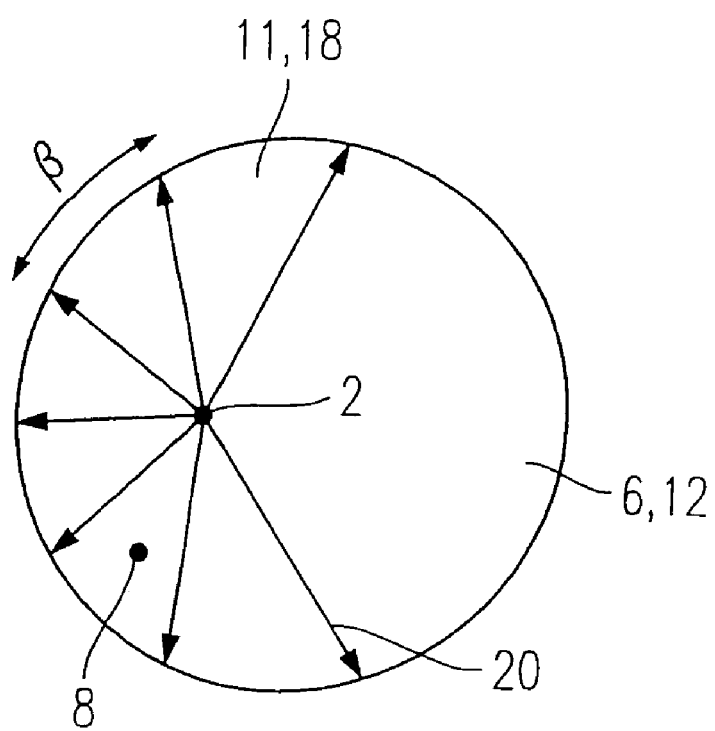
FIG. 7 shows a schematically illustrated jet pattern of a fuel injector of a fuel-injection system according to the present invention, the fuel injector producing an envelope in the form of a partial cone.

FIG. 7 shows a schematically illustrated jet pattern of a fuel injector of a fuel-injection system according to the present invention, the fuel injector producing a part-conical envelope. Fuel fan 11 or cone envelope 18 which emerges from fuel injector 2 in a non-coaxial manner and is only partially formed in this exemplary embodiment, namely in the form of a partial cone envelope, has 7 fuel jets 20 having uniform opening angles β of 40 degrees with respect to each other. In other exemplary embodiments, different opening angles β between fuel jets 20 may be chosen as well, depending on the processes taking place in combustion chamber 6. The position of the discharge-side end of fuel injector 2, which projects into combustion chamber 6, is located outside the center point of the cross-sectional plane of combustion chamber 6, as is the position of the discharge-side end of ignition device 8.

The present invention is not restricted to the exemplary embodiment shown, but may be used for any other internal combustion engine having fuel injection.

What is claimed is:

1. A fuel-injection system comprising:
   a fuel injector having a plurality of spray-discharge orifices for injecting fuel into a combustion chamber of an internal combustion engine; and
   an ignition device projecting into the combustion chamber, the ignition device having at least one first pole and at least one second pole, fuel jets emerging from the spray-discharge orifices spreading a fuel fan that substantially has a form of one of a cone and a partial cone below a region of the ignition device, an end of the at least one first pole being situated to a side adjacent to an end of the second pole, both ends being situated on about the same level of a longitudinal axis of the ignition device;
   wherein the spray-discharge orifices widen in a stepped manner in a direction of the combustion chamber.

2. The fuel-injection system according to claim 1, wherein the ends of the first pole and the second pole are at least partially made of a noble metal, including a platinum alloy.

3. The fuel-injection system according to claim 1, wherein a diameter of the end of the first pole and the second pole is less than one millimeter.

4. The fuel-injection system according to claim 1, wherein a distance between the end of the first pole and the end of the second pole is less than one millimeter.

5. The fuel-injection system according to claim 1, wherein a distance between the second pole and a cone envelope formed by the fuel jets is between 0.5 mm and 3 mm.

6. The fuel-injection system according to claim 1, wherein the fuel jets evenly spread the fuel fan, the fuel jets having uniform opening angles, with respect to each other.

7. The fuel-injection system according to claim 6, wherein the opening angle is between 25 degrees and 45 degrees.

8. The fuel-injection system according to claim 1, wherein a number of spray-discharge orifices is at least 4 and at most 12.

9. The fuel-injection system according to claim 1, wherein the spray-discharge orifices are situated in a multi-hole disk of the fuel injector.

10. The fuel-injection system according to claim 1, wherein the fuel fan has an envelope opening angle of 70 degrees to 110 degrees.

11. The fuel-injection system according to claim 1, wherein the fuel fan extends coaxially with respect to a longitudinal axis of the fuel injector.

12. The fuel-injection system according to claim 1, wherein a longitudinal axis of the fuel fan encloses an angle other than zero with respect to a longitudinal axis of the fuel injector.

* * * * *